United States Patent
Cantwell et al.

(10) Patent No.: US 12,003,608 B2
(45) Date of Patent: Jun. 4, 2024

(54) SYSTEM AND METHOD FOR REPURPOSING LAYER 2 SWITCH AS A LAYER 1 SWITCH

(71) Applicant: NetScout Systems, Inc., Westford, MA (US)

(72) Inventors: Larry Cantwell, Moorestown, NJ (US); Diego Warszawski, Cherry Hill, NJ (US); David L. Sclarsky, Cherry Hill, NJ (US)

(73) Assignee: Netscout Systems, Inc., Westford, MA (US)

( * ) Notice: Subject to any disclaimer, the term of this patent is extended or adjusted under 35 U.S.C. 154(b) by 330 days.

(21) Appl. No.: 17/589,327

(22) Filed: Jan. 31, 2022

(65) Prior Publication Data

US 2022/0159101 A1   May 19, 2022

Related U.S. Application Data

(63) Continuation-in-part of application No. 16/509,722, filed on Jul. 12, 2019, now abandoned.

(60) Provisional application No. 62/697,173, filed on Jul. 12, 2018.

(51) Int. Cl.
| | | |
|---|---|---|
| *H04L 12/28* | (2006.01) | |
| *H04L 69/08* | (2022.01) | |
| *H04L 69/321* | (2022.01) | |
| *H04L 69/323* | (2022.01) | |
| *H04L 69/324* | (2022.01) | |

(52) U.S. Cl.
CPC ............ *H04L 69/08* (2013.01); *H04L 69/321* (2013.01); *H04L 69/323* (2013.01); *H04L 69/324* (2013.01)

(58) Field of Classification Search
CPC ..... H04L 69/08; H04L 69/321; H04L 69/323; H04L 69/324; H04L 49/205; H04L 49/60; H04L 49/65; H04L 67/34; H04L 63/101
USPC ........ 370/229–236, 254–255, 400, 407–410; 709/223–226, 230–235, 239–242
See application file for complete search history.

(56) References Cited

U.S. PATENT DOCUMENTS

| | | | | |
|---|---|---|---|---|
| 2014/0269273 A1* | 9/2014 | Cors | ....................... | H04L 47/80 370/230 |
| 2014/0269290 A1* | 9/2014 | Cors | ..................... | H04L 63/101 370/232 |
| 2015/0341265 A1* | 11/2015 | Basso | ................. | H04L 29/0653 370/392 |
| 2015/0341365 A1* | 11/2015 | Basso | ..................... | H04L 29/06 711/108 |
| 2016/0173338 A1* | 6/2016 | Wolting | .............. | H04L 67/1097 709/223 |
| 2017/0111295 A1* | 4/2017 | Snowdon | ................ | G06F 13/00 |
| 2018/0167307 A1* | 6/2018 | Barry | ..................... | H04L 45/50 |

* cited by examiner

*Primary Examiner* — Thai D Hoang
(74) *Attorney, Agent, or Firm* — Foley & Lardner LLP

(57) ABSTRACT

A computer-implemented method for repurposing one or more software configurable layer 2 switches in an IP (Internet Protocol) computer network to function as a layer 1 switch. Ternary Content-Addressable Memory (TCAM) is reconfigured in each of the one or more layer 2 switches and one or more pipeline engines are routed to emulate layer 1 switching functionality in each of the one or more layer 2 switches.

20 Claims, 6 Drawing Sheets

SYSTEM AND METHOD FOR REPURPOSING LAYER 2 SWITCH AS A LAYER 1 SWITCH

RELATED APPLICATIONS

This application is a continuation-in-part of U.S. patent application Ser. No. 16/509,722 filed Jul. 12, 2019, which claims priority to U.S. Patent Application Ser. No. 62/697,173, which are incorporated herein by reference in their entirety.

FIELD OF THE INVENTION

The disclosed embodiments generally relates to network devices, and more particularly, to network switching and routing devices.

BACKGROUND OF THE INVENTION

As is well known, the Internet Protocol (IP) is the method or protocol by which data is sent from one computer to another on the Internet. Each computer (known as a host) on the Internet has at least one IP address that uniquely identifies it from all other computers on the Internet. However, prior to using the IP in networks, most network switching applications were served by scalable Layer 1 or "circuit based" switches. As IP networks developed into the modern day complex packet switch environment that currently exists, circuit switches and the components that permitted Layer 1 switches to operate have become increasingly extinct. It is to be appreciated that this often presents a problem for those applications that still require Layer 1 switching. For instance, a "Test Automation" application that still requires Layer 1 switching and will continue to exist into the distant future, even at network speeds of 10 Gbps and above. It is to be understood and appreciated that "Test Automation" relates to using specialized test hardware and software systems that are driven by test scripts to dynamically cycle through test cases and configurations to exercise hardware and software products dynamically rather than running each test case manually. Exemplary benefits of Test Automation are: reduced time to market resulting from Test Automation; the ability to share capital assets; and the ability to reconfigure test resources rapidly (e.g., in seconds as opposed to days).

It is to be appreciated that prior to the below discussed embodiments of the present invention, there were no viable options available to provide dense Layer 1 switching at speeds of 10 Gbps and above. Prior art attempts to do so proved not be viable due to prohibitive cost structures associated with bringing such custom silicon devices to market.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, described is how Layer 2 devices can be re-programmed/re-purposed in software to operate as Layer 1 Switching devices.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
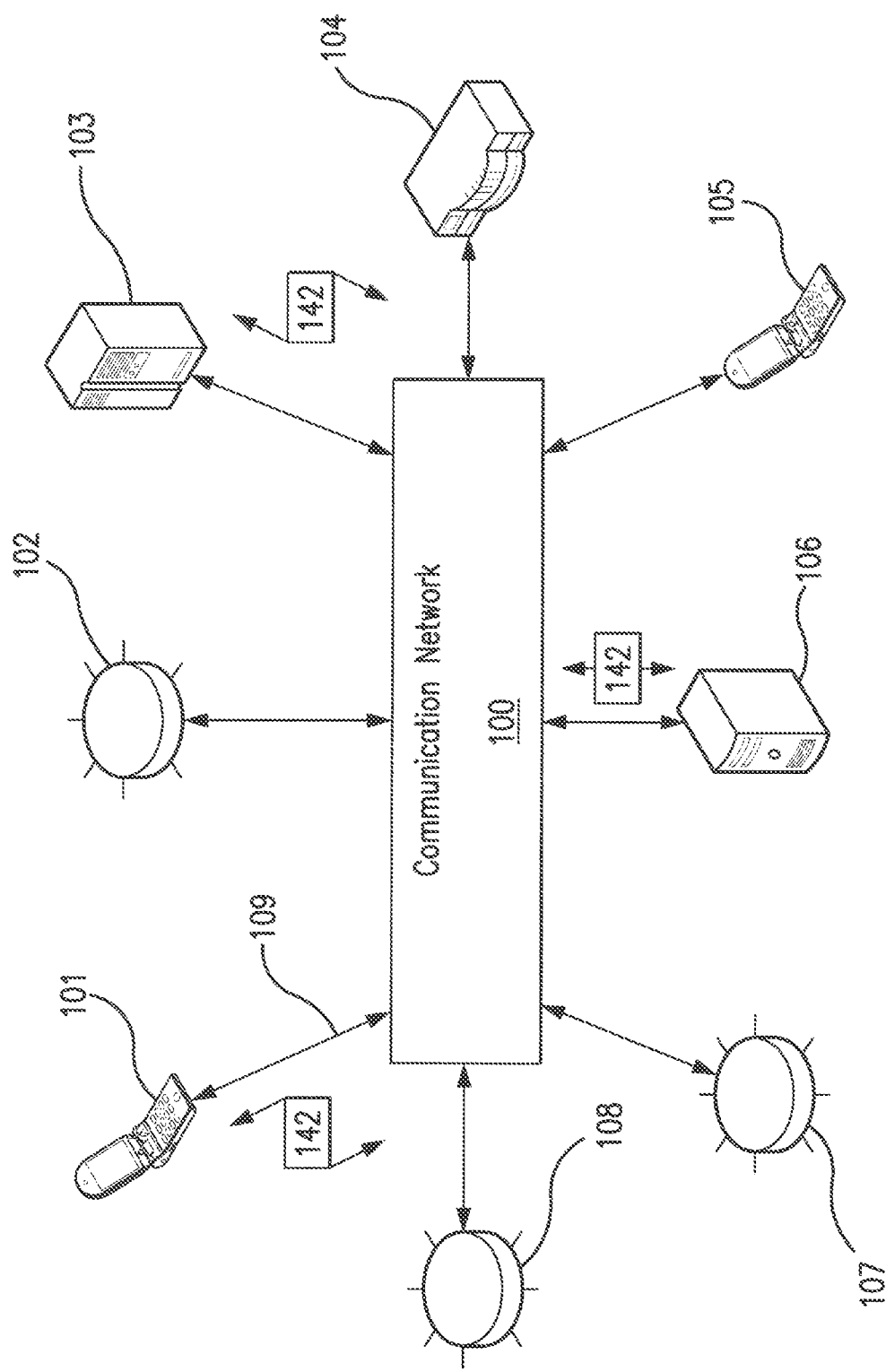
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, packet analyzer device 104, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 2:
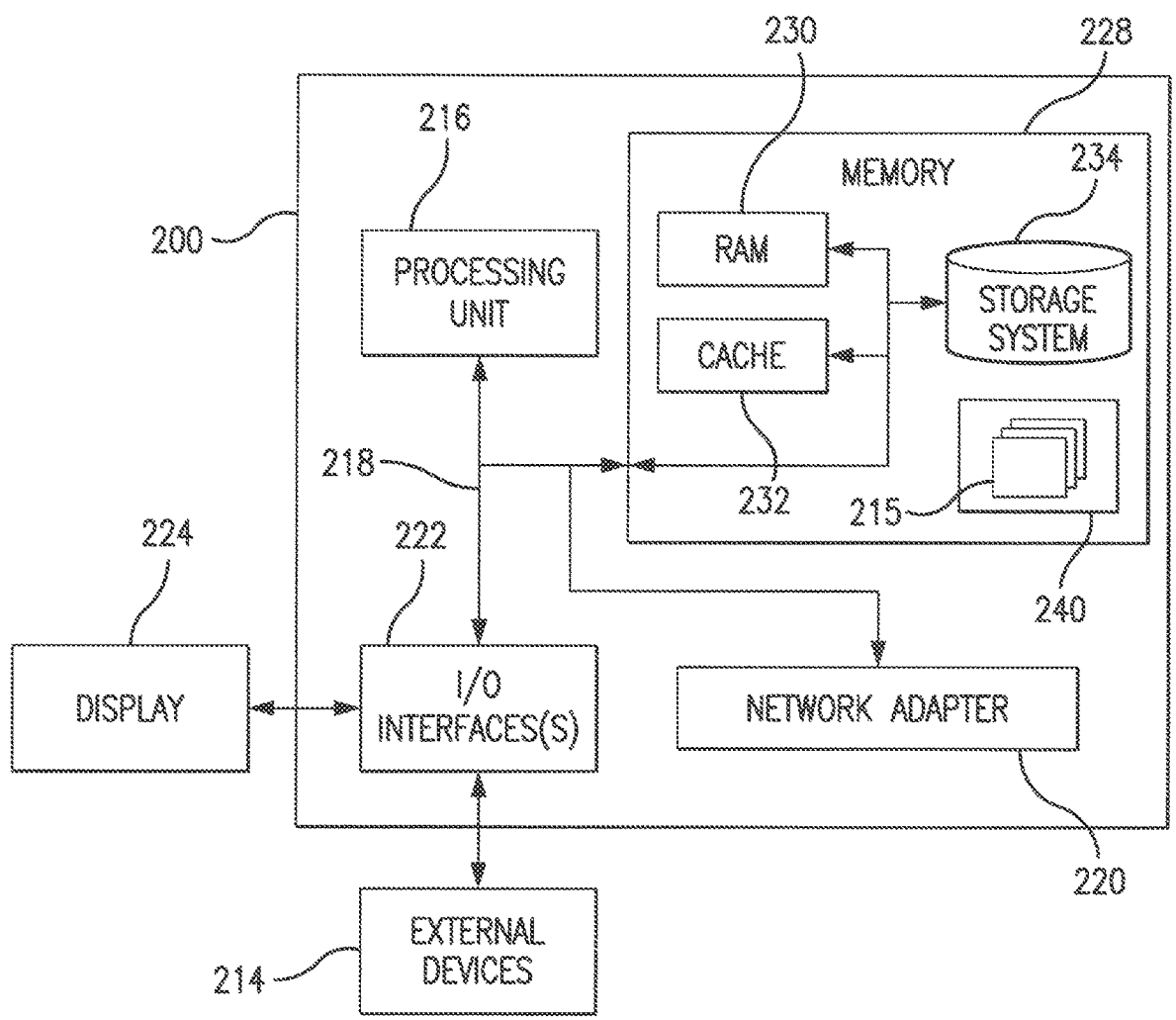
FIG. 2 illustrates an example network device/node coupled to the communication network of FIG. 1.

FIG. 2 is a schematic block diagram of an example network computing device 200 (e.g., client computing device 103, switching device 104, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present disclosure will now be provided with reference to a layer 2 switching device 104 of FIG. 1, which as described below is configurable to be re-programmed/re-purposed in software to operate as Layer 1 Switching devices, in accordance with the described embodiments.

Figure 3:
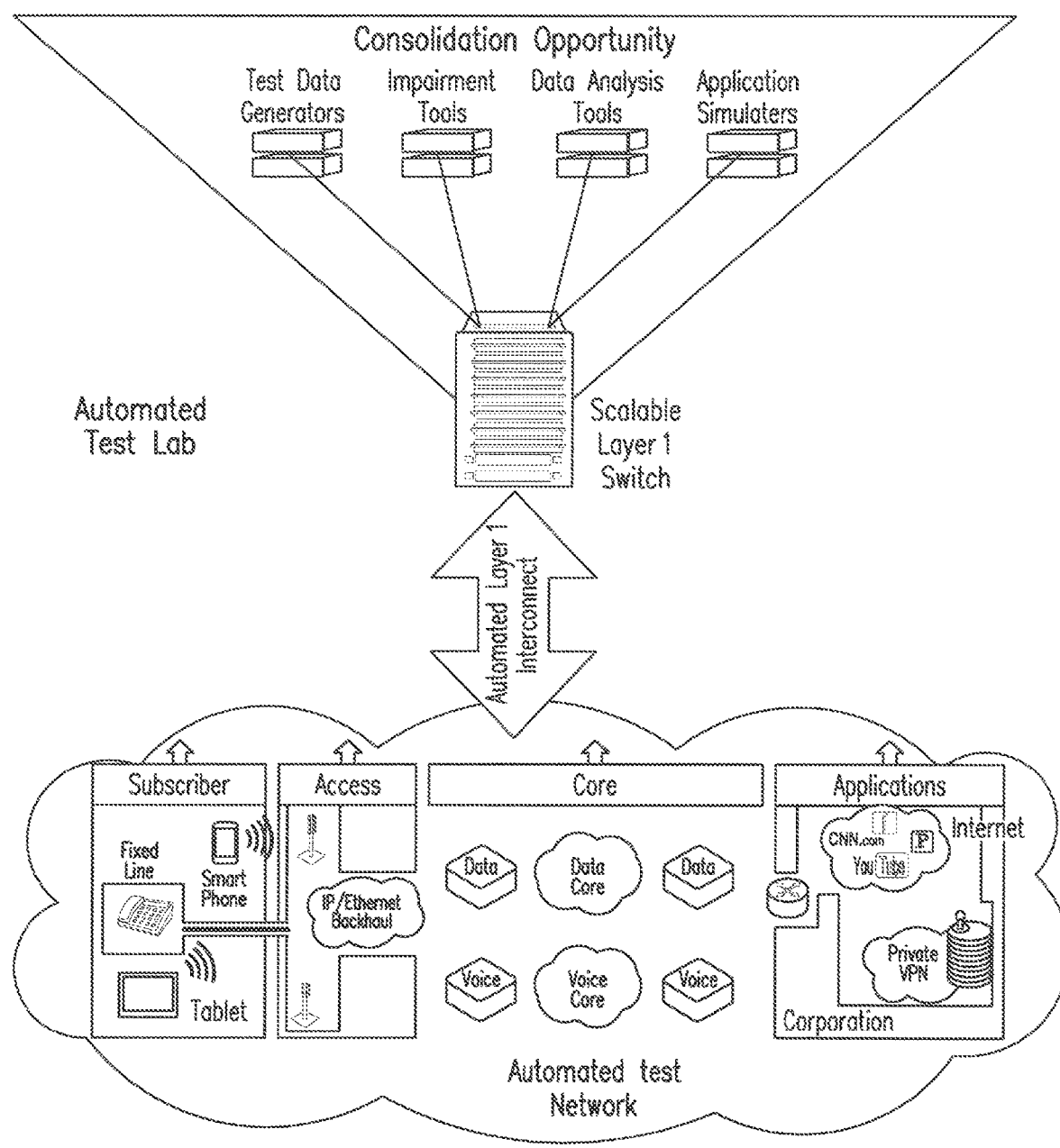
FIG. 3 illustrates certain components of a Test Lab Automation infrastructure having a Layer 1 switch.

First, for background purposes, FIG. 3 illustrates certain components of a test lab automation infrastructure including a Layer 1 Switch which enables rapid and remote re-configuration of the test lab devices under test and test tools. It is to be understood a Layer 1 Switch functions as an automated patch panel and in legacy terms, it provides a dedicated or "circuit based" connection as opposed to a packet switched connection. It is to be appreciated that as IP networks extend to 10 Gbps line rates and above, costs have become prohibitive such that Layer 1 silicon vendors/manufacturers can no longer produce dense semiconductor devices that operate at such advanced speeds (100 Gbps line rates and beyond). Accordingly, an embodiment of the present disclosure overcomes the aforesaid problem by utilizing a silicon Layer 2 packet switching device, which may contained/encompassed in 'bare metal' switches in conjunction with a custom software load that enables the layer 2 devices to operate/emulate as if they were Layer 1 circuit switching devices.

Thus, what is discussed herein is reprogramming/repurposing the Ternary Content-Addressable Memory (TCAM) and routing pipeline engines in dense commodity Layer 2/Layer 3 "bare metal" switches and routers to enable them to operate as a Layer 1 switch. A distinct advantage is this effectively circumvents the extinction of Layer 1 Switching and the applications that it serves such as Test Lab Automation, described above.

Figure 4:
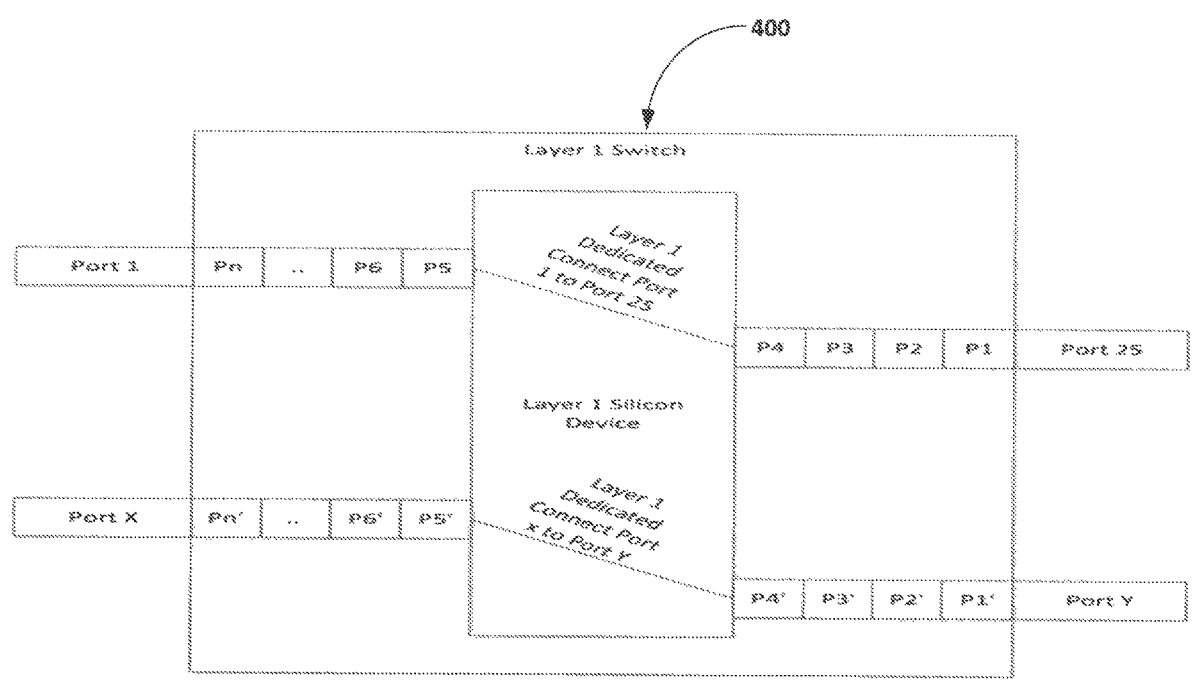
FIG. 4 illustrates an exemplary layer 1 switch.
Figure 5:
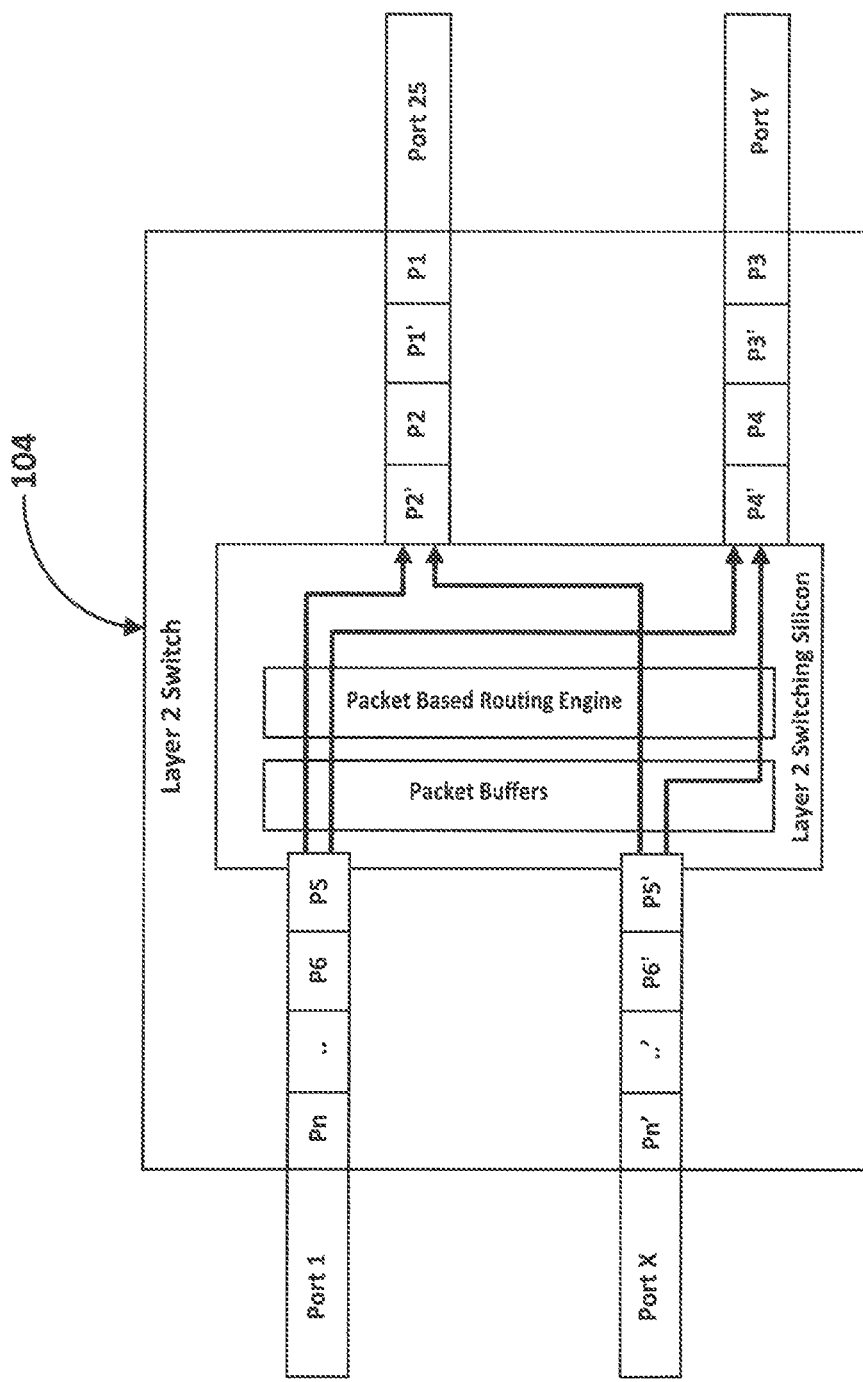
FIG. 5 illustrates an exemplary layer 2 switch having one or more of the components of a device shown in FIG. 2 and coupled to the communication network of FIG. 1

With reference now to the exemplary Layer 1 switch 400 of FIG. 4 and Layer 2 switch 104 of FIG. 5, it is to be understood that a Layer 1 switch 400 is different than a Layer 2 switch 104 in terms of the functionality they deliver/provide. For instance, a layer 1 switch 400 provides a circuit based connection which essentially functions as a wire, whereas a layer 2 switch provides "connectionless" packet intermix that generally does not guarantee packet delivery, packet order or packet latency. FIGS. 2 and 3 illustrate exemplary differences between a Layer 1 400 and Layer 2 104 switch in terms of how packets are transported from ingress to egress.

For instance, exemplary functions unique to a Layer 1 switch 400 and critical to the applications that layer 1 switches 400 support include: providing the ability to pass packets of any size at line rate without dropping, modifying or re-routing packets; providing the ability to pass errored packets without modification; providing latency under 500 nanoseconds; providing secure connections that are one to one (e.g., not mixed packet flows); and providing the ability to tap and multicast without violating any of the aforesaid layer 1 switch functions.

Figure 6:
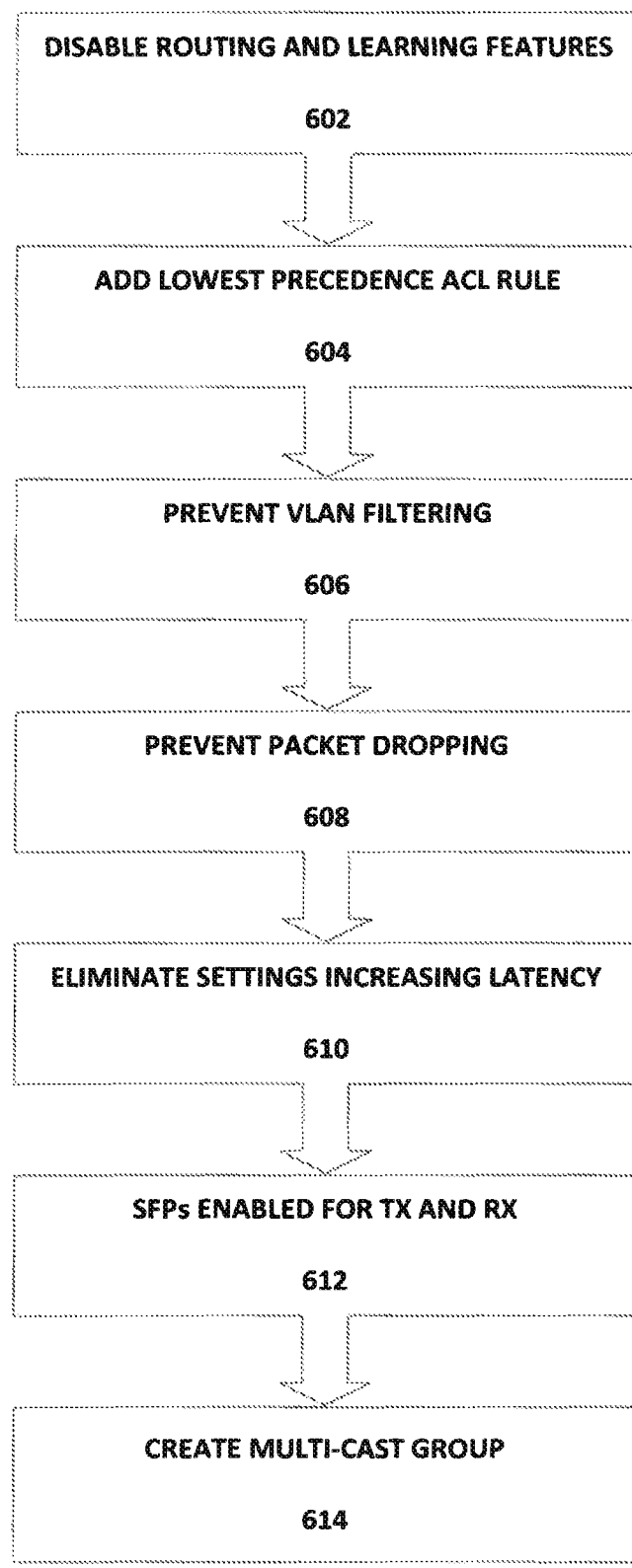
FIG. 6 illustrates an example flow chart for a method for repurposing a layer 2 switch as a layer 1 switch, according to some embodiments of the present disclosure.

With the aforesaid critical requirements of layer 1 switching discussed above, an illustrated embodiment of the present invention for programming/repurposing a layer 2 switch 104 to operate as a layer 1 switch 400 comprises, in a default configuration, and with reference to the flowchart of FIG. 6 preferably includes disabling learning and routing functions in the layer 2 switch, step 602. A lowest precedence ACL rule is then added in which condition is ALL PORTS, action is DENY ALL, step 604. The layer 2 switch 104 is then configured to prevent Virtual Local Area Network (VLAN) filtering since input frames may contain VLAN tags, step 606. Since some layer 2 switches may drop packets according to different Layer 2 protocols/standards, configure the layer 2 switch to prevent dropping any packet, step 608. Also preferably disable store and forward functionality in the layer 2 switch to eliminate settings that will increase latency which generally must be less than 300 nanoseconds for a Layer 1 switch, step 610. Thereafter in a basic one-to-one connection (e.g., Port.1 to Port.2 in one direction), both SFPs (small form-factor pluggable) in the layer 2 switch are enabled for Transmission (TX) and (RX), step 612. A multicast group is then created, such that Port.2 is added to the group and an ACL (access control list) rule is added such that condition is input Port.1 and action is redirect to multicast group (a.k.a. redirect list), step 614.

Thus what has been discussed and disclosed above enables the ability to take a Layer 2,3 network switch/router 104 and repurpose it to function as a Layer 1 switch. It is to be appreciated that Layer 1 switching is used in many applications, for example, Test Automation, which enables the ability to dynamically reconfigure test labs in the click of a button as opposed to taking several days or more to reconfigure test lab resources.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for repurposing one or more software configurable layer 2 switches in an IP (Internet Protocol) computer network to function as a layer 1 switch comprising:
   reconfiguring Ternary Content-Addressable Memory (TCAM) in each of the one or more layer 2 switches;
   routing one or more pipeline engines to emulate layer 1 switching functionality in each of the one or more layer 2 switches;
   disabling forwarding functionality to decrease latency in each of the one or more layer 2 switches;
   enabling Small Form-Factor Pluggable Ports (SFPs) for Transmission (TX) and Reception (RX) in each of the one or more layer 2 switches;
   creating a multicast group such that a Port.2 is added to the created multicast group in each of the one or more layer 2 switches; and
   providing an Access Control List (ACL) rule wherein when a condition is input Port.1 an action is to redirect to the created multicast group in each of the one or more layer 2 switches.

2. The computer-implemented method as recited in claim 1, wherein at least one of the one or more layer 2 switches are "bare metal" switches.

3. The computer-implemented method as recited in claim 1, further including disabling learning and routing functions in each of the one or more layer 2 switches.

4. The computer-implemented method as recited in claim 1, further including provide a lowest precedence ACL rule whereby condition is ALL PORTS and action is DENY ALL in each of the one or more layer 2 switches.

5. The computer-implemented method as recited in claim 1, further including preventing VLAN filtering in each of the one or more layer 2 switches.

6. The computer-implemented method as recited in claim 1, further including preventing packet dropping in each of the one or more layer 2 switches.

7. A computer-implemented method for repurposing one or more software configurable layer 2 switches in an IP (Internet Protocol) computer network to function as a layer 1 switch comprising:
   reconfiguring Ternary Content-Addressable Memory (TCAM) in each of the one or more layer 2 switches;
   routing one or more pipeline engines to emulate layer 1 switching functionality in each of the one or more layer 2 switches;
   enabling Small Form-Factor Pluggable Ports (SFPs) for Transmission (TX) and Reception (RX) in each of the one or more layer 2 switches;
   creating a multicast group such that a Port.2 is added to the created multicast group in each of the one or more layer 2 switches; and
   providing an Access Control List (ACL) rule wherein when a condition is input Port.1 an action is to redirect to the created multicast group in each of the one or more layer 2 switches.

8. The computer-implemented method as recited in claim 7, wherein at least one of the one or more layer 2 switches are "bare metal" switches.

9. The computer-implemented method as recited in claim 7, further including disabling learning and routing functions in each of the one or more layer 2 switches.

10. The computer-implemented method as recited in claim 6, further including disabling forwarding functionality to decrease latency in each of the one or more layer 2 switches.

11. The computer-implemented method as recited in claim 7, further including provide a lowest precedence ACL rule whereby condition is ALL PORTS and action is DENY ALL in each of the one or more layer 2 switches.

12. The computer-implemented method as recited in claim 7, further including preventing VLAN filtering in each of the one or more layer 2 switches.

13. The computer-implemented method as recited in claim 7, further including preventing packet dropping in each of the one or more layer 2 switches.

14. A computer-implemented method for repurposing one or more software configurable layer 2 switches in an IP (Internet Protocol) computer network to function as a layer 1 switch comprising:
   reconfiguring Ternary Content-Addressable Memory (TCAM) in each of the one or more layer 2 switches;
   routing one or more pipeline engines to emulate layer 1 switching functionality in each of the one or more layer 2 switches;
   creating a multicast group such that a Port.2 is added to the created multicast group in each of the one or more layer 2 switches; and
   providing an Access Control List (ACL) rule wherein when a condition is input Port.1 an action is to redirect to the created multicast group in each of the one or more layer 2 switches.

15. The computer-implemented method as recited in claim 14, wherein at least one of the one or more layer 2 switches are "bare metal" switches.

16. The computer-implemented method as recited in claim 14, further including disabling learning and routing functions in each of the one or more layer 2 switches.

17. The computer-implemented method as recited in claim 16, further including disabling forwarding functionality to decrease latency in each of the one or more layer 2 switches.

18. The computer-implemented method as recited in claim 17, further including enabling Small Form-Factor Pluggable Ports (SFPs) for Transmission (TX) and Reception (RX) in each of the one or more layer 2 switches.

19. The computer-implemented method as recited in claim 14, further including provide a lowest precedence ACL rule whereby condition is ALL PORTS and action is DENY ALL in each of the one or more layer 2 switches.

20. The computer-implemented method as recited in claim 14, further including:
   preventing VLAN filtering in each of the one or more layer 2 switches; and
   preventing packet dropping in each of the one or more layer 2 switches.

* * * * *